US006977917B2

(12) United States Patent
Skog et al.

(10) Patent No.: US 6,977,917 B2
(45) Date of Patent: *Dec. 20, 2005

(54) METHOD AND APPARATUS FOR MAPPING AN IP ADDRESS TO AN MSISDN NUMBER WITHIN A SERVICE NETWORK

(75) Inventors: Roberg Skog, Hasselby (SE); Ingvar Berg, Nykil (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 885 days.

This patent is subject to a terminal disclaimer.

(21) Appl. No.: 09/802,521

(22) Filed: Mar. 9, 2001

(65) Prior Publication Data

US 2001/0028636 A1  Oct. 11, 2001

Related U.S. Application Data

(63) Continuation-in-part of application No. 09/596,802, filed on Jun. 19, 2000.
(60) Provisional application No. 60/188,437, filed on Mar. 10, 2000.

(51) Int. Cl.[7] .................................. H04J 3/24
(52) U.S. Cl. ........................... 370/349; 370/389
(58) Field of Search ............... 370/349, 389, 370/345, 467, 352–357, 465, 466, 338, 401, 370/328, 313, 395.1, 351, 400, 402, 360, 370/229–231, 235, 310, 329; 455/433, 456, 455/422.1, 556, 426, 466, 435, 445, 403, 455/410, 411, 575, 151.2, 517, 428; 709/206, 709/219; 705/44, 34, 56, 58, 75, 76, 67

(56) References Cited

U.S. PATENT DOCUMENTS

| 5,930,701 | A | * | 7/1999 | Skog ......................... 455/415 |
| 5,966,663 | A | * | 10/1999 | Gleason ..................... 455/466 |
| 5,974,453 | A | * | 10/1999 | Andersen et al. ........... 709/220 |
| 6,091,958 | A | * | 7/2000 | Bergkvist et al. ........ 455/456.4 |
| 6,137,791 | A | * | 10/2000 | Frid et al. ................... 370/352 |

(Continued)

FOREIGN PATENT DOCUMENTS

| EP | RS 105432US | 1/2001 |
| WO | WO 99/33291 | 7/1999 |
| WO | WO 00/04679 | 1/2000 |
| WO | WO 00/46963 | 8/2000 |

OTHER PUBLICATIONS

M. Hoogenboom and P. Steemers, "Security for Remote Access and Mobile Applications", *Computers & Security, International Journal Devoted to the Study of Technical and Finalcial Aspects of Computer Security*, Elsevier Science Ltd., vol. 19, No. 2, Feb. 2000, pp. 149-163, XP004204675.

*Primary Examiner*—Wellington Chin
*Assistant Examiner*—Jamal A. Fox

(57) ABSTRACT

A system and method for associating an MSISDN of a mobile terminal with a temporarily assigned IP address is disclosed. A first server located within a wireless communications network generates and transmits a start packet to a service network responsive to an access request by a mobile terminal. The start packet includes the MSISDN of the mobile terminal and an assigned IP address. A second server within the service network extracts the MSISDN in the IP address from the received start packet and stores this information together within a database. When a service request is made by the mobile terminal to a server in the service network, the MSISDN may be determined from the database and used to access user parameters in a user database.

19 Claims, 3 Drawing Sheets

U.S. PATENT DOCUMENTS

| | | | |
|---|---|---|---|
| 6,167,040 A * | 12/2000 | Haeggstrom | 370/352 |
| 6,185,196 B1 * | 2/2001 | Mademann | 370/327 |
| 6,327,267 B1 * | 12/2001 | Valentine et al. | 370/466 |
| 6,356,761 B1 * | 3/2002 | Huttunen et al. | 455/456.1 |
| 6,430,407 B1 * | 8/2002 | Turtiainen | 455/411 |
| 6,469,998 B1 * | 10/2002 | Burgaleta Salinas et al. | 370/338 |
| 6,487,602 B1 * | 11/2002 | Thakker | 709/230 |
| 6,549,776 B1 * | 4/2003 | Joong | 455/433 |
| 6,608,832 B2 * | 8/2003 | Forslow | 370/353 |
| 6,611,516 B1 * | 8/2003 | Pirkola et al. | 370/352 |
| 6,687,243 B1 * | 2/2004 | Sayers et al. | 370/356 |
| 2002/0049675 A1 * | 4/2002 | Kailamaki et al. | 705/44 |
| 2003/0039237 A1 * | 2/2003 | Forslow | 370/352 |

* cited by examiner

METHOD AND APPARATUS FOR MAPPING AN IP ADDRESS TO AN MSISDN NUMBER WITHIN A SERVICE NETWORK

RELATED APPLICATIONS

This application claims priority form and incorporates herein by reference the entire disclosures of U.S. Provisional Application Ser. No. 60/188,437, filed Mar. 10, 2000 and is a Continuation in Part of U.S. Pat. application Ser. No. 09/596,802, filed Jun. 19, 2000.

BACKGROUND OF THE INVENTION

1. Technical Field of the Invention

The present invention relates to service networks, and more particularly, to the mapping of temporary IP addresses to established MSISDN numbers.

2. Description of Related Art

Wireless application protocol (WAP) is positioned at the conversions of two rapidly evolving network technologies, wireless data and the Internet. Both the wireless data market and the Internet are growing very quickly and are continuously reaching new customers. The explosive growth of the Internet has fueled the creation of new and exciting information services. Most of the technology developed for the Internet has been designed for desktop and larger computers and medium to high bandwidth networks.

Hand held wireless devices present a more constrained computing environment compared to desktop computers. They have less powerful CPU's and memory than desktop systems. Similarly, wireless data networks present a more constrained communications environment compared to wired networks. Wireless networks have fundamental limitations with respect to power, available spectrum and mobility. The WAP specification has been developed to address mobile network characteristics by adapting existing network technologies for the Internet to the specialized requirements of hand-held wireless data devices.

Access to a wireless application protocol system utilizing WAP technologies is provided via a WAP gateway node. The WAP gateway node is normally located within an Internet service provider (ISP) providing access to the Internet for mobile terminals. However, the WAP gateway node may alternatively be provided by a mobile services operator. In order to obtain access to the WAP gateway node, a user must be authenticated. There are two possible authentication points for a user. The first authentication point is during setup of a data call. This authentication is handled by the integrated access system (IAS) located within a mobile switching center utilized by the mobile terminal and/or a remote authentication dial-in user service (RADIUS) authentication server located in the WAP network.

The user may also be authenticated when accessing particular servers within the WAP network. This manner of authentication may be handled in two different ways. Proxy authentication may be used wherein the WAP gateway returns a status code of "407" to a WAP browser. This initiates the same type of basic authentication as occurs for a hypertext transport protocol (HTTP) message. A user ID and password are entered by the user in response to this status code and this data is included within every IP packet from the browser.

A WAP gateway supports several different types of bearer messages, for example, IP, SMS, USSD, etc. A MSISDN is used within the WAP gateway to determine if a user is allowed to use the WAP gateway node, to charge for using the WAP gateway node, and to enable charges for specific content to be transmitted. If SMS or USSD bearer protocols are used, the MSISDN is always included within the data packet and this poses no identification problems for the WAP gateway. However, when using the IP protocol, the integrated access system within the mobile switching center allocates a temporary IP address to the mobile terminal. This IP address is included within messages transmitted to the WAP gateway. The WAP gateway has no way at present to determine the MSISDN number associated with a particular IP address. Thus, some manner for enabling the WAP gateway to associate the temporary IP addresses with a fixed MSISDN number is desired.

Additionally, existing systems require a mobile terminal which is accessing services within a network to sign on to various servers in the network multiple times, once for each server. This is due to the need to provide authentication and information associated with the mobile terminal which is not individually available to each server.

SUMMARY OF THE INVENTION

The present invention overcomes the foregoing and other problems with a system and method for associating a mobile terminal's temporarily assigned IP address with a MSISDN number for use with authentication, billing and personalization processes within a service network. In response to a request by a mobile terminal, a first server within a wireless network generates a start packet. The start packet contains an MSISDN of the mobile terminal and an IP address assigned to the mobile terminal by the first server. The start packet is transmitted to a first database within a service network wherein the MSISDN and the assigned IP address are stored within the first database. The first database enables storage of the MSISDN and the IP address together such that the database may be accessed to determine an MSISDN associated with the IP address. The database is accessible by other servers within the service networks that are directly accessed by the mobile terminal. The other servers may obtain the MSISDN of the mobile terminal responsive to these requests from the mobile terminal using the IP address and use the MSISDN to obtain additional data about the user from other user databases within the service network.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
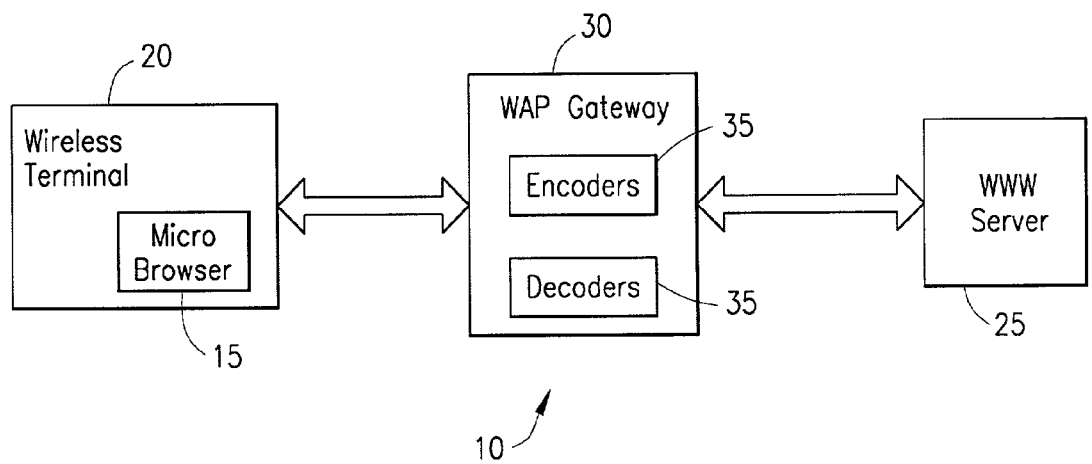
FIG. 1 is a block diagram illustrating a WAP network.

Referring now to the drawings, and more particular to FIG. 1, there is illustrated a WAP network 10. A micro browser 15 within a wireless terminal 20 enables the user to access world wide web servers 25 on the Internet via a WAP gateway server 30. The WAP gateway 30 comprises a protocol gateway which translates requests from a WAP protocol (WSP, WTP, WTLS and WDP) to a WWW protocol (HTTP and TCP/IP). This is accomplished via content encoders and decoders 35 within the WAP gateway server 30.

Figure 2:
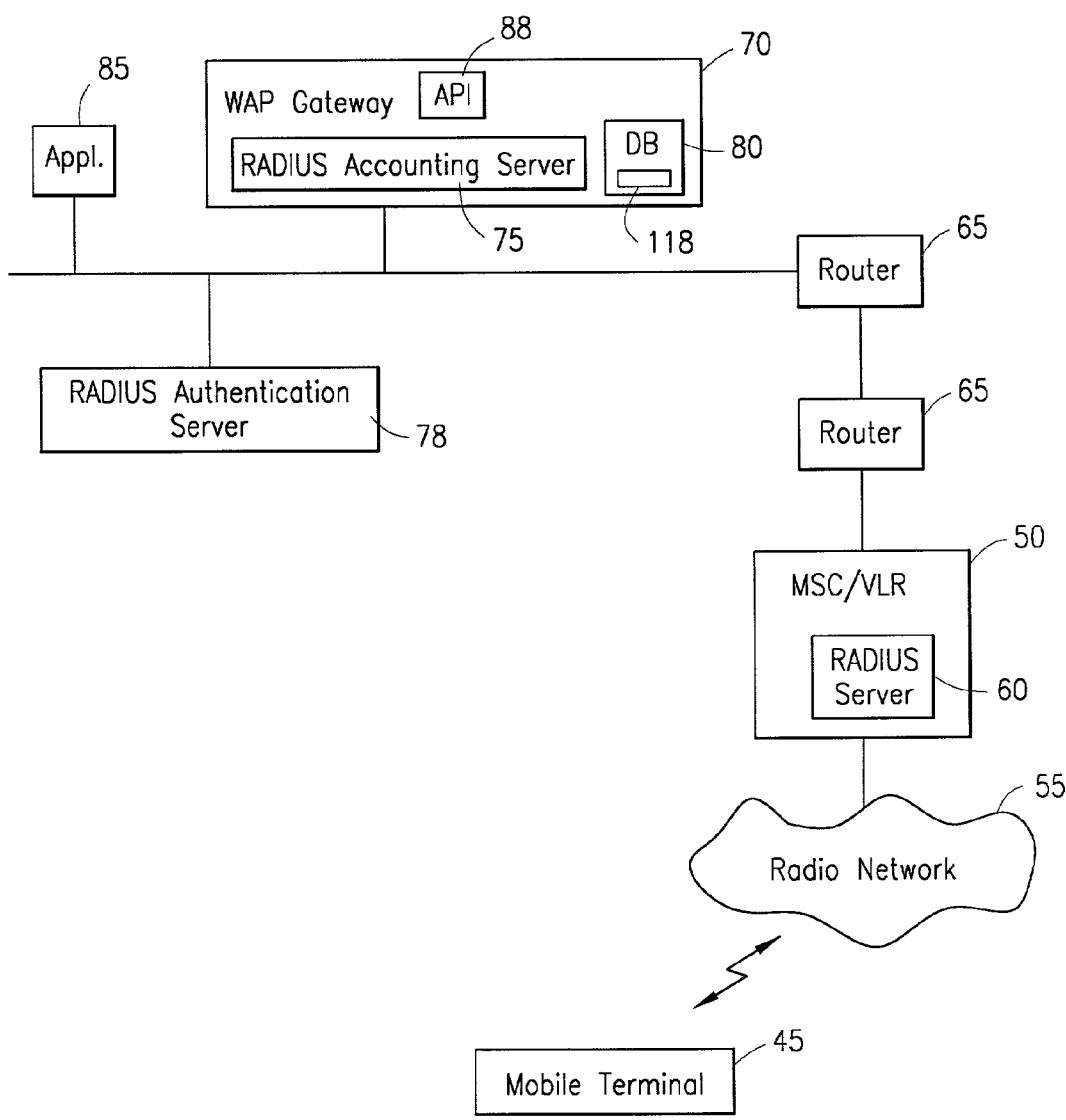
FIG. 2 is a block diagram of a WAP network incorporating the IP to MSISDN mapping technique of the present invention.

Referring now to FIG. 2, there is illustrated a block diagram of a system which utilizes radius accounting messages as a manner for mapping IP addresses to an MSISDN number. While the following description of mapping an IP address to an MSISDN number is done with respect to an authentication process, the system and method may also be used with a billing process, personalization process, etc. The system includes a mobile terminal 45 which may comprise a mobile telephone, portable computer, personal data assistant or any other mobile electronic device capable of communicating with a MSC/VLR 50 via a wireless radio network 55. It should be well understood by one skilled in the art that the wireless radio network for communicating between the mobile terminal 45 and MSC/VLR 50 would consist of a base transceiver station, base station and other components necessary within a wireless radio network.

While the described embodiment uses RADIUS Accounting messages to carry out the described invention, other systems performing similar functions may be used. When a client is configured to use RADIUS Accounting, at the start of service delivery the client will generate an Accounting Start packet describing the type of service being delivered and the user to whom the service is being delivered. The Accounting start packet is sent to the RADIUS Accounting server, which will send back an acknowledgment that the packet has been received. At the end of service delivery the client will generate an Accounting Stop packet describing the type of service that was delivered and optionally statistics such as elapsed time, input and output octets, or input and output packets. The client will send that to the RADIUS Accounting server, which will send back an acknowledgment that the packet has been received. By the present invention, RADIUS is used for transmitting IP-address and MSISDN at session start. Other types of information can also be transmitted, e.g., by using RADIUS Accounting for billing or personalization procedures. Other systems capable of transmitting the IP address and MSISDN information between the networks might also be used in place of a RADIUS system.

The MSC/VLR 50 includes a remote authentication dial-in user service (RADIUS) server 60 configured to transmit a RADIUS accounting message from the MSC/VLR 50 to the WAP gateway 70. The RADIUS accounting messages are transported to the WAP gateway 70 through routers 65 interconnecting the MSC/VLR 50 and the WAP gateway 70. A RADIUS accounting server 75 is located within the WAP gateway 70. The RADIUS accounting server 75 is responsive to the received RADIUS accounting messages from the MSC/VLR 50 and upon receipt of these messages updates a mapping session database 80 within the WAP gateway 70. The mapping session database 80 includes a plurality of storage locations for an assigned temporary IP address and an associated MSISDN of the mobile terminal 45.

The RADIUS accounting messages comprise packets of data which describe the type of service being delivered, and the user to which the service is to be delivered. Information in the packet includes among other things, the MSISDN number, number of frames, and the IP address of the mobile terminal 45. The information within a packet relating to IP address and MSISDN number is used to update the database 80 within the WAP gateway 70. RADIUS accounting messages indicating the stoppage of a connection between a mobile terminal 45 and the WAP gateway 70 cause the database 80 to be updated such that the MSISDN and IP address for the mobile terminal are no longer stored and associated together in the database.

Once a mobile terminal 45 has been properly authenticated by the WAP gateway 70 and the IP address and the IP address and MSISDN of the mobile terminal stored in the database 80, the mobile terminal may access applications 85 within the WAP network. The RADIUS authentication server, in collaboration with a translation application program (API) interface 88, provides a conduit for the database 80, enabling applications to access and determine a MSISDN associated with an IP address for the mobile terminal 45.

Figure 3:
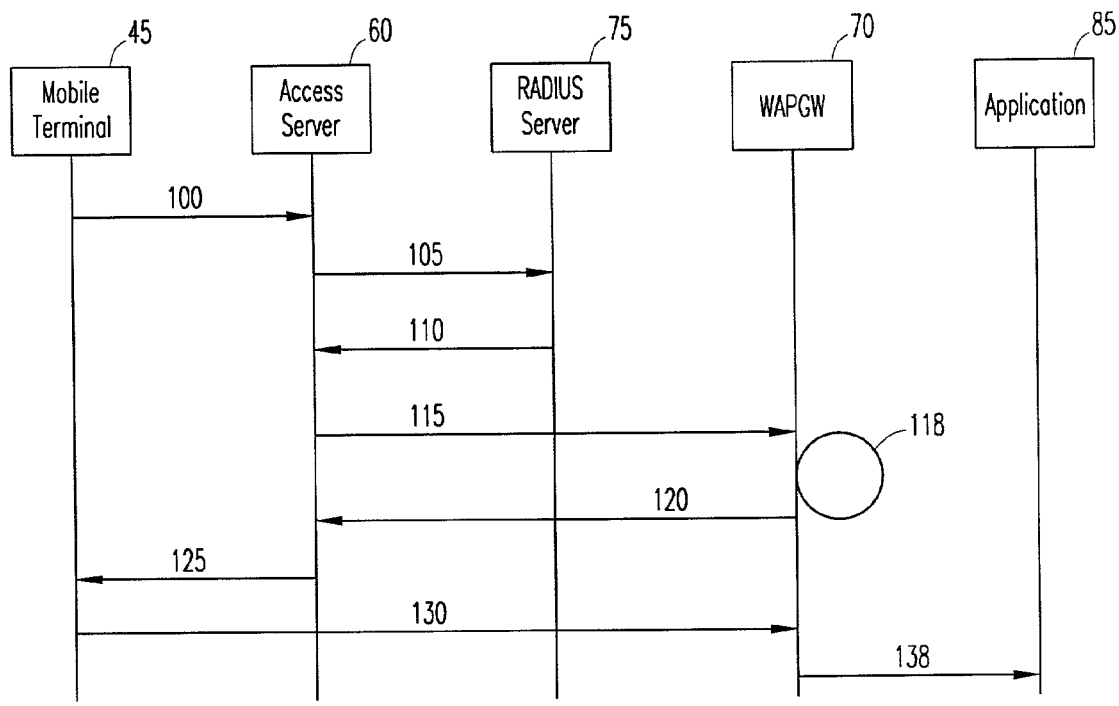
FIG. 3 is a signaling diagram illustrating a request of a particular WAP application by a mobile terminal.

Referring now to FIG. 3, there is provided a first example of a signaling diagram utilizing the method for mapping a MSISDN number to a temporarily assigned IP address for a mobile terminal 45 accessing a WAP gateway 70. The process illustrated in FIG. 3 describes when a mobile terminal 45 requests use of a WAP application 85 residing upon a web server on the Internet. The mobile terminal 45 transmits a message 100 to the access server 60 in order to establish a connection to the access server using the point-to-point protocol (PPP). Before establishing a connection with the mobile terminal 45, the access server 60 performs an authentication process wherein the mobile terminal 45 transmits authentication information including the PPP User ID of the mobile terminal and a password to the access server 60 using a password authentication procedure (PAP).

The access server 60, residing within the mobile switching center 50 (FIG. 2) generates an access request message 105 for transmission to the RADIUS Authentication server 78 located within the WAP gateway 70. The access request message 105 includes the PPP User ID and password transmitted to the access server 60 by the mobile terminal 45. The access request message comprises a request from the access server 60 to the RADIUS server 75 requesting user access to a particular site. The RADIUS server 75 replies to the access server 60 with an access accept message 110 to indicate that access has been granted to the mobile terminal 45.

Next, a PPP connection is established between the access server 60 and the mobile terminal 45. IP packets are transmitted over the connection. The only information included about the sender within the IP packets transmitted over the PPP connection is the IP address of the source mobile terminal 45. The IP address cannot alone be used as a user ID since the IP address is dynamically allocated to the mobile terminal 45 by the access server 60 or the RADIUS server 75 during the PPP connection setup.

To overcome this problem, the IP address and the MSISDN of the mobile terminal 45 are transmitted over the PPP connection from the access server 60 to the WAP gateway 70 as an accounting request message 115 to enable mapping between these identifiers. The IP address and the MSISDN are stored as a record 118 within the mapping session database 80 within the WAP gateway 70. The WAP gateway 70 replies to the accounting request message 115 by means of a mandatory accounting response message 120 to the access server 60 using the RADIUS protocol. Once this connection is established, the user may generate a request 130 for access to a particular WAP application 85 ("service") on a web server. This request is forwarded from the mobile terminal 45 to the WAP gateway 70. The WAP gateway 70 forwards the mobile terminal request 138 to the requested application 85. The WAP gateway 70 may determine the IP address of the mobile terminal 45 by examining the IP packet header to determine the IP address of the mobile terminal. The MSISDN of the mobile terminal 45 is determined by examining the mapping session database 80 and the associated IP address via the application program interface 88. The determined MSISDN is placed in an HTTP header of packets used to contact the WAP application 85.

Figure 4:
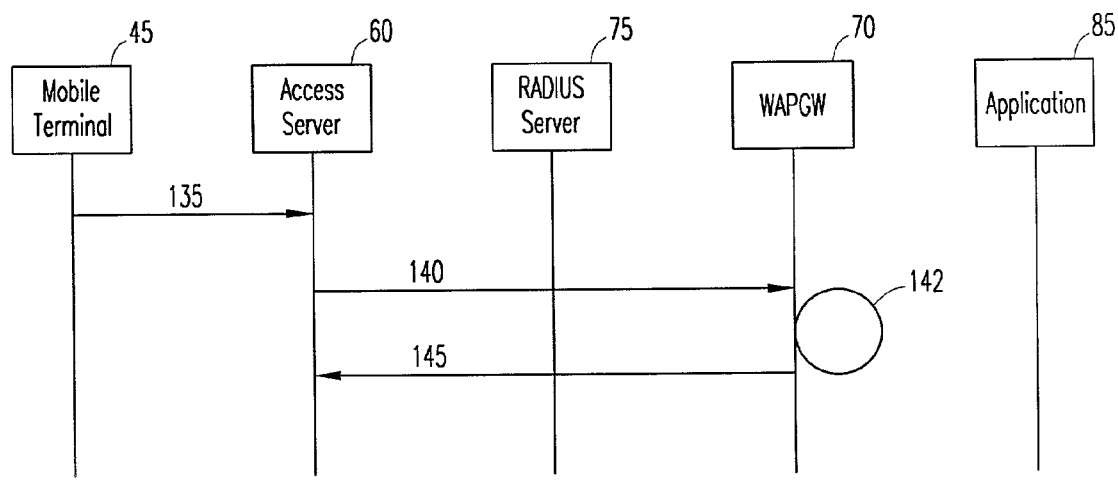
FIG. 4 is a signaling diagram illustrating the termination of a PPP connection between a mobile terminal and the WAP gateway.

Referring now to FIG. 4, there is illustrated a signaling diagram wherein a mobile terminal 45 with an established PPP connection to the access server 60 terminates the PPP connection. Initially, the mobile station 45 terminates at 135 the PPP connection with the access server 60. In response to the termination of the PPP connection, the access server 60 transmits an accounting request stop message 140 to the WAP gateway 70. This request includes the MSISDN and IP address of the mobile terminal 45. In response to the accounting request stop message 140, the WAP gateway 70 removes the entry within the mapping session database 80 associated with the MSISDN number and IP address. The WAP gateway 70 responds to the accounting request stop message by means of an accounting response message 145 acknowledging cancellation of the PPP connection.

Figure 5:
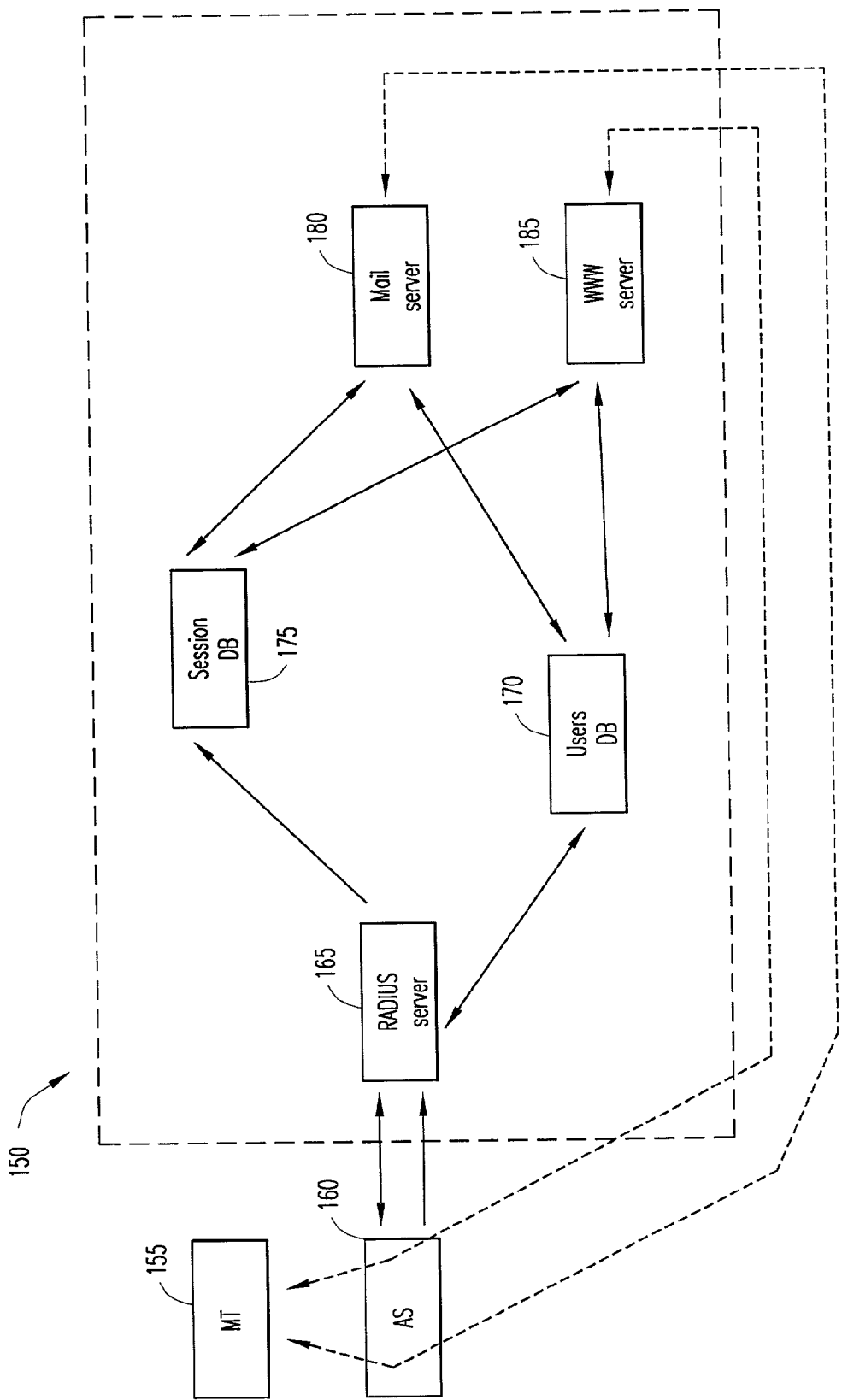
FIG. 5 is an additional embodiment wherein the IP to MSISDN mapping technique of the present invention is incorporated into a service network.

Referring now to FIG. 5, there is illustrated an alternative embodiment wherein instead of being implemented within a WAP network, the system is implemented within a generic service network 150. A service network 150 is defined as an IP network that hosts a number of services for users of a mobile terminal 155 which provides the mobile terminal access to the internet. A service network may also include the WAP functionality previously described. The mobile terminal 155 accesses the service network 150 by either dialing in directly or by accessing the service network 150 through the internet. The mobile station 155 interacts with the service network 150 via the access server 160. The access server contains a modem pool for setting up connections between the mobile station and the service network 150. For example, in a GPRS network, the access server 160 would be implemented in the GGSN (GPRS Gateway Serving Node).

When a mobile terminal 155 requests use of a particular application provided by the service network 150, a request is transmitted to the RADIUS server 165 via the access server 160. In response to the request, the RADIUS server 165 performs an authentication process for the mobile terminal 155 with the user database 170 for the mobile terminal 155. The user database 170 (which may be associated with a server) contains information on the user of the mobile terminal 155 and may request a password or other authentication data. After authentication, the access server 160 generates an accounting start request message to the RADIUS server 165. The accounting start request message comprises a request from the access server 160 to the RADIUS server 165 to access a particular application and includes the MSISDN and IP address for the mobile terminal. The IP address and MSISDN for the mobile terminal are transmitted from the RADIUS server 165 to the session database 175 (which may be associated with a server) where they are stored.

Once the mobile terminal 155 has been authenticated and had its IP address and MSISDN number stored within the session database 175, the mobile terminal 155 may make use of a single sign-on ability wherein the mobile terminal 155 only logs into the service network 150 a single time. After this first log in, the mobile terminal 155 may access any service which is provided by the service network 150 such as reading e-mail, paying a parking fee, etc. The session database 175 may be accessed by any application or server provided by the service network 150. The mobile terminal 155 is identified by finding the IP address of the mobile terminal within the session database and obtaining the associated MSISDN. By utilizing the mobile terminal's IP address as a key, the service network 150 may find out which services the mobile terminal 155 subscribes to, billing addresses and similar types of information.

In one example, after the mobile terminal 155 accesses the service network 150, the mobile terminal 155 accesses the mail server 180 in order to read and or send e-mail. In response to the attempt to access the mail server 180 by the mobile terminal 155, the mail server 180 makes a request of the session database 175 for the provided user's IP address to be translated into the MSISDN. The mail server 180 requests the user parameters from the user database 170 by using the provided MSISDN.

In a second example, when the mobile terminal 155 accesses a world wide web server 185, the world wide web server 185 accesses the session database 175 with the IP address of the mobile terminal 155 in order to determine the MSISDN of the mobile terminal 155. The WWW server 185 then uses the provided MSISDN number to access user parameters within the user database 170.

In this embodiment, the session database 175 is accessible by other servers within the service network that may be directly accessed by the mobile station. These other servers can query the session database 175 in order to obtain the user MSISDN instead of requiring a separate log-in process for each server. The MSISDN is associated with a specific mobile terminal 155, and the mobile terminal 155 is assumed to belong to a specific user. There is thus a one-to-one relationship between user identity and MSISDN in the user database 170. The user database 170 is queried by the RADIUS authentication server during the authentication process.

The previous description is of a preferred embodiment for implementing the invention, and the scope of the invention should not necessarily be limited by this description. The scope of the present invention is instead defined by the following claims.

What is claimed is:

1. A method for associating a MSISDN with a temporary IP address within a service network, comprising the steps of:
   transmitting a start packet to a database associated with the service network, the start packet including a MSISDN and a temporary IP address of the mobile terminal; and
   storing the MSISDN and the temporary IP address in the database wherein the MSISDN and the temporary IP address are associated with each other responsive to the start packets;
   receiving a request for a service from the mobile terminal at a third server within the service network;
   determining an MSISDN of the mobile terminal by accessing the database using the temporary IP address of the mobile terminal;
   placing the determined MSISDN into an http header for applications within the service network using http; and
   transmitting the http header to the application within the service network using http with a data packet.

2. The method of claim 1, further comprising the steps of:

transmitting a stop packet to the database associated with the service network, the stop packet including the MSISDN and the temporary IP address of the mobile terminal; and deleting the stored MSISDN and the temporary IP address from the database responsive to the stop packet.

3. The method of claim 2, wherein the step of transmitting further comprises the step of configuring an access server to transmit an account stop packet as the stop packet.

4. The method of claim 2, wherein the step of transmitting further comprises the step of configuring a RADIUS server to transmit an account stop packet as the stop packet.

5. The method of claim 4, further comprising the step of transmitting an acknowledgment packet from a server associated with the database responsive to the stop packet.

6. The method of claim 1, wherein the step of transmitting further comprises the step of configuring an access server to transmit starting packet as the start packet.

7. The method of claim 1, wherein the step of transmitting further comprises the step of configuring a RADIUS server to transmit an account starting packet as the start packet.

8. The method of claim 7, further comprising the step of transmitting an acknowledgment packet from a server associated with the database responsive to the start packet.

9. The method of claim 1, further comprising the step of accessing a user database for user parameters responsive to the determined MSISDN.

10. The method of claim 1, wherein the method is used in at least one of an authentication process, a billing process, and a personalization process.

11. A system comprising:
a mobile switching center of a wireless network;
a first server associated with a wireless network for generating a start packet responsive to an access request from a mobile terminal, the start packet containing a MSISDN provided by the mobile terminal and an IP address assigned to the mobile terminal by the first server, wherein the first server is located within the mobile switching of the wireless network;
a database associated with a service network having storage locations for a plurality of MSISDNs and associated assigned IP addresses;
a second server associated with the service network for retrieving the stored MSISDN the database responsive to an IP address in a service request from the mobile terminal; and a RADIUS accounting server within the service network and associated with the database.

12. The system of claim 11, wherein the first server comprises an integrated access system server.

13. The system of claim 11, wherein the third server is configured to:
receive the session start packet from the first server in response to an access request from the mobile terminal;
store the MSISDN number and the temporary IP-address in the database.

14. The system of claim 11, wherein the first server further generates a stop packet responsive to termination of a connection with the mobile terminal.

15. The system of claim 11, wherein the system associates a MSISDN of a mobile terminal with a temporarily assigned IP address during at least one of an authentication process, a billing process and a personalization process.

16. A method, comprising the steps of:
authenticating a mobile terminal accessing to a service network;
generating a start packet containing a MSISDN and an IP address of the mobile terminal;
storing the MSISDN and the IP address in the start packet in a database associated with the service network;
determining the MSISDN of the mobile terminal using the IP address of the mobile terminal responsive to a request to a server in the service network from the mobile terminal;
placing the determined MSISDN into an http header for applications within the service network using http; and
transmitting the httn header to the application within the service network using http with a data packet.

17. The method of claim 16, further including the step of obtaining user parameters from a user database in the service network using the determined MSISDN.

18. The method of claim 16, wherein the step of transmitting further comprises the step of configuring a RADIUS server to transmit an account starting packet as the start packet.

19. The method of claim 16, further comprising the step of transmitting an acknowledgment packet from a server associated with the database responsive to the start packet.

* * * * *

UNITED STATES PATENT AND TRADEMARK OFFICE
CERTIFICATE OF CORRECTION

PATENT NO. : 6,977,917 B2  Page 1 of 1
APPLICATION NO. : 09/802521
DATED : December 20, 2005
INVENTOR(S) : Skog et al.

It is certified that error appears in the above-identified patent and that said Letters Patent is hereby corrected as shown below:

On the Title Page, in item (56), under "OTHER PUBLICATIONS", in Column 2, Line 4, delete "Finalcial" and insert -- Financial --, therefor.

In Column 7, Line 39, in Claim 11, after "switching" insert -- center --.

In Column 8, Line 32, in Claim 16, delete "httn" and insert -- http --, therefor.

Signed and Sealed this

Twenty-seventh Day of November, 2007

JON W. DUDAS
*Director of the United States Patent and Trademark Office*